(12) United States Patent
Pan et al.

(10) Patent No.: US 8,230,251 B2
(45) Date of Patent: Jul. 24, 2012

(54) TIME SEQUENCE CONTROL CIRCUIT

(75) Inventors: Ai-Yu Pan, Shenzhen (CN); Chao-Rong Lai, Shenzhen (CN); Jing-Li Xia, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 263 days.

(21) Appl. No.: 12/768,578

(22) Filed: Apr. 27, 2010

(65) Prior Publication Data

US 2011/0191605 A1 Aug. 4, 2011

(30) Foreign Application Priority Data

Feb. 4, 2010 (CN) .......................... 2010 1 0301229

(51) Int. Cl.
*G06F 1/26* (2006.01)
(52) U.S. Cl. ......... 713/330; 323/283; 323/311; 713/300
(58) Field of Classification Search .................. 713/300, 713/330, 400, 502, 503; 323/282–284, 311
See application file for complete search history.

(56) References Cited

U.S. PATENT DOCUMENTS

| | | | |
|---|---|---|---|
| 7,594,130 B1 * | 9/2009 | Hu .................. | 713/300 |
| 7,853,810 B2 * | 12/2010 | Huang et al. ........... | 713/300 |
| 7,917,786 B2 * | 3/2011 | He et al. .......... | 713/320 |
| 2010/0211811 A1 * | 8/2010 | Zhou et al. .......... | 713/330 |

* cited by examiner

*Primary Examiner* — Glenn A Auve
(74) *Attorney, Agent, or Firm* — Altis Law Group, Inc.

(57) ABSTRACT

A time sequence control circuit that can control time sequence of a computer. After the computer is turned on, a power supply terminal outputs a high level enabling signal to an enabling pin of a power supply circuit, the power supply circuit is active. A power supply pin of the power supply circuit outputs a standard voltage to a power pin of each of the motherboard components. A first electronic switch is turned on, a second electronic switch is turned off, and a power supply state pin of the power supply circuit outputs a high level power supply state signal to a power state input pin of a main chip after the power supply circuit outputs the standard voltage.

9 Claims, 1 Drawing Sheet

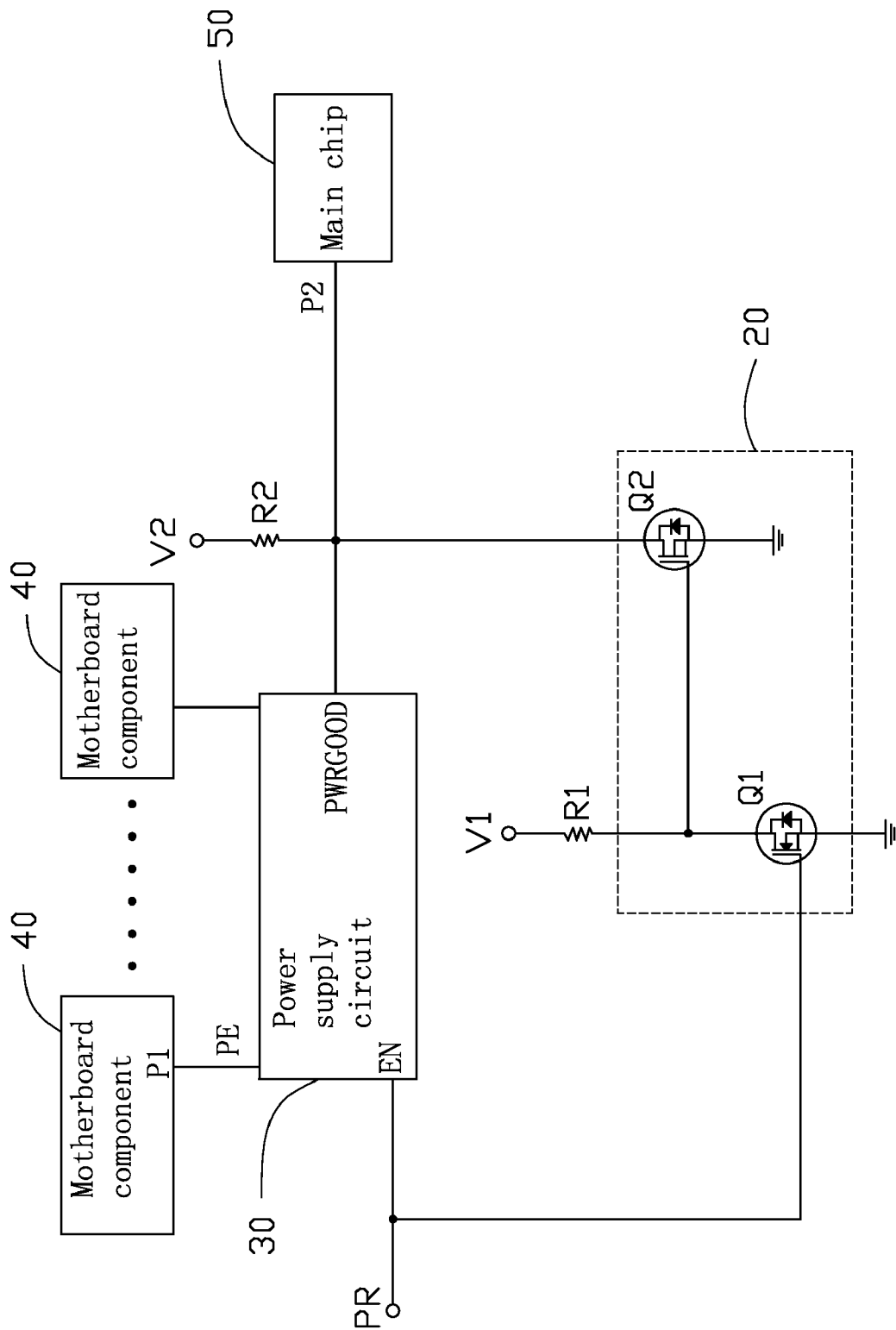

TIME SEQUENCE CONTROL CIRCUIT

BACKGROUND

1. Technical Field

The present disclosure relates to control circuits, and particularly to a time sequence control circuit of a motherboard of a computer.

2. Description of Related Art

Operation of an electronic device or a component, such as a motherboard of a computer, may have special time sequence requirements. Generally, time sequence of the component can keep the computer working normally. For example, after the computer is turned on, a power supply circuit receives a high level enabling signal before the power supply circuit outputs a standard voltage to a motherboard component, and then the power supply circuit outputs a high level power supply state signal to a main chip, such as a south bridge chip, and before the computer is turned on, the main chip receives a low level power supply state signal. However, if the time sequence is not followed, the computer may not work properly.

BRIEF DESCRIPTION OF THE DRAWING

The drawing is a circuit diagram of an exemplary embodiment of a time sequence control circuit.

DETAILED DESCRIPTION

Referring to the drawing, an exemplary embodiment of a time sequence control circuit includes a switch circuit 20, a power supply circuit 30, a plurality of motherboard components 40, and a main chip 50. In this embodiment, the plurality of motherboard components 40 may be memories, graphic cards, or other types of electronic components mountable on a motherboard, and the main chip 50 may be a central processing unit (CPU), a south bridge chip, a super input/output (I/O) chip, or other type of chip mountable on the motherboard.

The switch circuit 20 includes two transistors Q1 and Q2. A gate of the transistor Q1 is connected to a power supply terminal PR. A source of the transistor Q1 is grounded. A drain of the transistor Q1 is connected to a power supply V1 via a resistor R1, and is also connected to a gate of the transistor Q2. A source of the transistor Q2 is grounded. A drain of the transistor Q2 is connected to a power supply V2 via a resistor R2, and is also connected between the power supply circuit 30 and the main chip 50. In this embodiment, the transistors Q1 and Q2, functioning as electronic switches, are n-channel metal oxide semiconductor field effect transistors (NMOSFETs), the power supply V1 is a 5 volt (V) standby power supply, the power supply V2 is a 3.3V system power supply, and resistance of the resistor R2 is 1000 ohms. In other embodiments, the transistors Q1 and Q2 can be other types of electronic switches, such as npn transistors.

The power supply circuit 30 includes an enabling pin EN, a power supply state pin PWRGOOD, and a power supply pin PE. The enabling pin EN is connected to the power supply terminal PR. The power supply state pin PWRGOOD is connected to a power state input pin P2 of the main chip 50, and is also connected to a node between the resistor R2 and the drain of the transistor Q2. The power supply pin PE is connected to a power pin P1 of each of the motherboard components 40.

Before the computer is turned on, the power supply terminal PR is at low level, such as 0V, the enabling pin EN of the power supply circuit 30 is at low level, and the power supply state pin PWRGOOD of the power supply circuit 30 may output a voltage greater than 0.6V, which may make the main chip 50 work abnormally. During this time, the transistor Q1 is turned off, the gate of the transistor Q2 is at high level, and the transistor Q2 is turned on. The power supply state pin PWRGOOD of the power supply circuit 30 timely becomes low level because of the switch circuit 20, and the power state input pin P2 of the main chip 50 receives a low level power supply state signal, indicating that power of each of the motherboard components 40 is not ready. Thereby, the main chip 50 is prevented from working abnormally before the computer is turned on.

After the computer is turned on, the power supply terminal PR outputs an enabling signal (e.g., gradually goes up to 2V) to the enabling pin EN of the power supply circuit 30. If the enabling signal is less than 0.6V, the circuit works the same as before the computer is turned on. If the enabling signal is equal to or greater than 0.6V and less than a high level (e.g., 2V), the transistor Q1 is turned on, the gate of the transistor Q2 is at low level, the transistor Q2 is turned off, and there is low current flowing to the power state input pin P2 of the main chip 50 through the resistor R2 because of the high resistance of the resistor R2. The power state input pin P2 of the main chip 50 receives a low level power supply state signal, indicating that power of each of the motherboard components 40 is not ready. Thereby, the main chip 50 is prevented from working abnormally when the voltage level signal is less than 2V. If the enabling signal is equal to or greater than 2V, the power supply circuit 30 is active, and the power supply pin PE of the power supply circuit 30 outputs a standard voltage to the power pin P1 of each of the motherboard components 40. The transistor Q1 is turned on, the gate of the transistor Q2 is at low level, the transistor Q2 is turned off, and there is low current flowing to the power state input pin P2 of the main chip 50 through the resistor R2. The power supply state pin PWRGOOD of the power supply circuit 30 outputs a high level power supply state signal (e.g., 2V) to the power state input pin P2 of the main chip 50 after the power supply circuit 30 outputs the standard voltage, indicating that power of each of the motherboard components 40 is ready. The main chip 50 starts working normally.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A time sequence control circuit of a computer, the control circuit comprising:
    a first electronic switch comprising a first terminal connected to a power supply terminal of the computer, a grounded second terminal, and a third terminal connected to a first power supply via a first resistor;
    a second electronic switch comprising a first terminal connected to the third terminal of the first electronic switch, a grounded second terminal, and a third terminal connected to a second power supply via a second resistor;
    a power supply circuit comprising an enabling pin connected to the power supply terminal, a power supply state pin connected to a node between the second resistor and the third terminal of the second electronic switch, and a power supply pin;

a plurality of motherboard components each comprising a power pin connected to the power supply pin of the power supply circuit; and a main chip comprising a power state input pin connected to the power supply state pin of the power supply circuit and the third terminal of the second electronic switch;

wherein after the computer is turned on, the power supply terminal outputs a high level enabling signal to the enabling pin of the power supply circuit, the power supply circuit is active, and the power supply pin of the power supply circuit outputs a standard voltage to the power pin of each of the motherboard components, the first electronic switch is turned on, the second electronic switch is turned off, the power supply state pin of the power supply circuit outputs a high level power supply state signal to the power state input pin of the main chip after the power supply circuit outputs the standard voltage.

2. The control circuit of claim 1, wherein the first and second electronic switches are n-channel metal oxide semiconductor field effect transistors (NMOSFETs), and the first to third terminals of the first and second electronic switches are drains, gates, and sources of the NMOSFETs, respectively.

3. The control circuit of claim 1, wherein the plurality of motherboard components comprises a graphic card.

4. The control circuit of claim 1, wherein the main chip is a central processing unit.

5. The control circuit of claim 1, wherein the main chip is a south bridge chip.

6. The control circuit of claim 1, wherein the main chip is a super input/output chip.

7. The control circuit of claim 1, wherein the first power supply is a 5 volt standby power supply.

8. The control circuit of claim 1, wherein the second power supply is a 3.3 volt system power supply.

9. The control circuit of claim 1, wherein resistance of the second resistor is 1000 ohms.

* * * * *